United States Patent
Venkataraman et al.

(10) Patent No.: US 9,015,721 B2
(45) Date of Patent: Apr. 21, 2015

(54) MANAGING ARRAY COMPUTATIONS DURING PROGRAMMATIC RUN-TIME IN A DISTRIBUTED COMPUTING ENVIRONMENT

(75) Inventors: Shivaram Venkataraman, Berkeley, CA (US); Indrajit Roy, Mountain View, CA (US); Mehul A. Shah, Saratoga, CA (US); Robert Schreiber, Palo Alto, CA (US); Nathan Lorenzo Binkert, Redwood City, CA (US); Parthasarathy Ranganathan, San Jose, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 329 days.

(21) Appl. No.: 13/562,248

(22) Filed: Jul. 30, 2012

(65) Prior Publication Data

US 2014/0033214 A1 Jan. 30, 2014

(51) Int. Cl.
*G06F 9/46* (2006.01)
*G06F 9/50* (2006.01)

(52) U.S. Cl.
CPC .................................. *G06F 9/5066* (2013.01)

(58) Field of Classification Search
None
See application file for complete search history.

(56) References Cited

U.S. PATENT DOCUMENTS

| | | | |
|---|---|---|---|
| 7,627,432 B2 | 12/2009 | Wilkinson | |
| 2005/0187977 A1* | 8/2005 | Frost | 707/104.1 |
| 2009/0006156 A1 | 1/2009 | Hunt et al. | |
| 2009/0327257 A1 | 12/2009 | Abouzeid et al. | |
| 2010/0281013 A1* | 11/2010 | Graefe | 707/715 |
| 2011/0082855 A1* | 4/2011 | Al-Omari et al. | 707/715 |
| 2011/0167433 A1 | 7/2011 | Appelbaum et al. | |
| 2011/0264663 A1 | 10/2011 | Verkasalo | |
| 2013/0204991 A1* | 8/2013 | Skjolsvold et al. | 709/223 |

* cited by examiner

*Primary Examiner* — Emerson Puente
*Assistant Examiner* — Sisley Kim
(74) *Attorney, Agent, or Firm* — Mahamedi Paradice LLP

(57) ABSTRACT

A plurality of array partitions are defined for use by a set of tasks of the program run-time. The array partitions can be determined from one or more arrays that are utilized by the program at run-time. Each of the plurality of computing devices are assigned to perform one or more tasks in the set of tasks. By assigning each of the plurality of computing devices to perform one or more tasks, an objective to reduce data transfer amongst the plurality of computing devices can be implemented.

15 Claims, 3 Drawing Sheets

MANAGING ARRAY COMPUTATIONS DURING PROGRAMMATIC RUN-TIME IN A DISTRIBUTED COMPUTING ENVIRONMENT

BACKGROUND

Linear algebra, the study of vector spaces, has many programming applications, such as in the areas of data mining, image processing, and graph analysis. Linear algebra operations can involve matrix operations, linear transformations, solutions the linear equations, and other such computations. There are many applications that require large-scale data analysis using linear algebra. Such applications can sometimes require extensive computing resources, such as provided by parallel computing environments.

DETAILED DESCRIPTION

Figure 1:
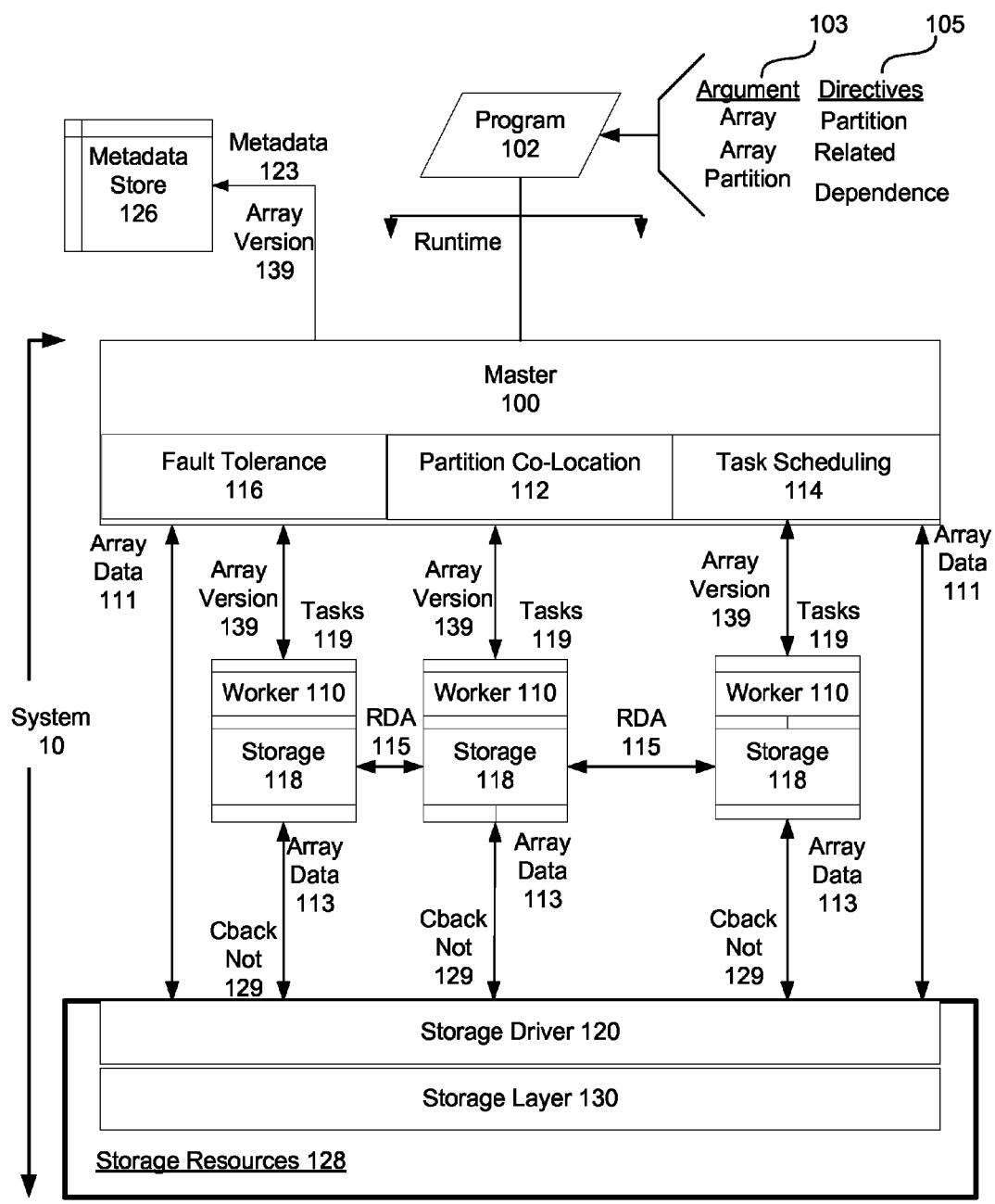
FIG. 1 illustrates an example system for managing array computations during programmatic run-time in a distributed computing environment, according to an embodiment.

Examples embodiments described herein provide a distributed computing environment that is configured to enhance processing of arrays during programming run-time. In such embodiments, the distributed arrays provide a shared, in memory view of multiple dimensional data stored across multiple machines.

Examples embodiments provided herein include system and method for managing array computations during programmatic run-time in a distributed computing environment. In some implementations, a plurality of array partitions are defined for use by a set of tasks of the program run-time. The array partitions can be determined from one or more arrays that are utilized by the program at run-time. Each of the plurality of computing devices are assigned to perform one or more tasks in the set of tasks. By assigning each of the plurality of computing devices to perform one or more tasks, an objective to reduce data transfer amongst the plurality of computing devices can be implemented. In particular, the objective can be implemented by (i) determining two or more array partitions that are accessed or modified by one or more tasks in the set of tasks during run-time, and (ii) locating the two or more array partitions on a first computing device of the plurality of computing devices during the run-time.

An example computing system includes a master node. a plurality of worker nodes, and a storage resource that maintains array data. The master node and the plurality of worker nodes implement a plurality of tasks that are implemented as part of a program during run-time. During run-time, the master node determines, for multiple arrays that are utilized in a program at run-time, a plurality of array partitions that are used by a set of tasks of the program run-time. The master node also assigns each of the plurality of workers to perform one or more tasks in the set of tasks. The master node may also determine two or more array partitions that are accessed or modified from the storage resource by one or more tasks in the set of tasks during run-time. Additionally, the master node selects to locate the two or more array partitions on a first worker of the plurality of workers during the run-time.

Still further, example embodiments provide an array in a distributed computing environment in which multiple computing devices are used. The array can be processed in connection with performance of a plurality of tasks that are handled concurrently by the multiple computing devices. A set of data transfer reduction objectives can be implemented in processing the array. The set of data transfer reduction objectives including (i) determining a array partition of the array that is accessed and modified by at least two of the plurality of tasks, and (ii) assigning a same one of the multiple computing devices to perform the at least two of the plurality of tasks.

Among other benefits, examples such as described herein enable efficient implementation of large-scale data analysis which require use of array computations (e.g., linear algebra).

An array refers to a multi-dimensional data element, represented by m×n. An array partition refers to a portion of an array, such as a row, column or block of an array.

One or more embodiments described herein provide that methods, techniques and actions performed by a computing device (e.g., node of a distributed file system) are performed programmatically, or as a computer-implemented method. Programmatically means through the use of code, or computer-executable instructions. A programmatically performed step may or may not be automatic.

Figure 2:
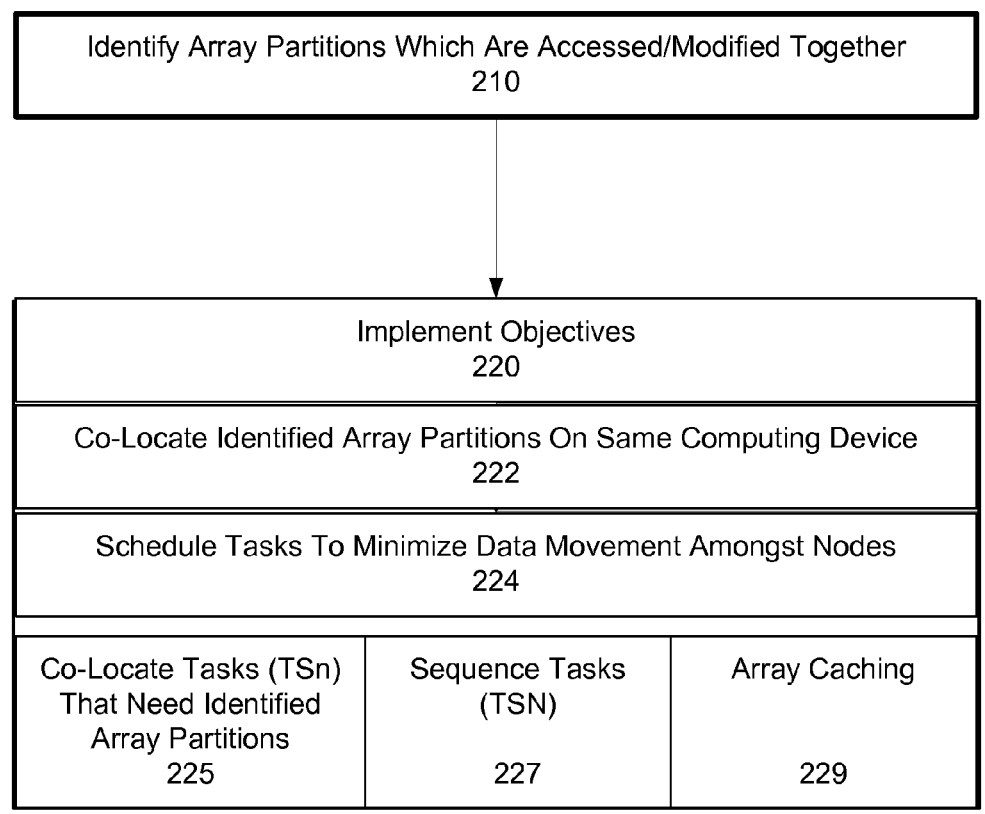
FIG. 2 illustrates an example method for managing array computations during programmatic run-time in a distributed computing environment, according to an embodiment.

With reference to FIG. 1 or FIG. 2, one or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

System Description

FIG. 1 illustrates an example system for managing array computations during programmatic run-time in a distributed computing environment, according to an embodiment. In an embodiment, a system 10 is implemented with a distributed computing environment that includes a master node 100 and one or more worker nodes 110. The distributed computing environment can also include storage resources 128. The worker nodes 110 can correspond to a network-connected computing devices that implements tasks and other functions. The master node 100 can include a server or other computing device that provides control (e.g., task assignment, coordination) and fault tolerance for the worker nodes 110. In some implementations, the storage resources 128 of the distributed computing environment can include a distributed or shared storage driver 120, and a storage layer 130.

In system 10, tasks 119 for executing program 102 can be distributed to the worker nodes 110 in parallel. In this way, parallel loops can execute, for example, functions of the program 102 that access and modify arrays (or array portions). While the program 102 can enable programmers to specify array partitions and their placement, system 10 can be implemented to programmatically determine placement of arrays, array portions, and functions and tasks 119 that utilize arrays, based on pre-defined data transfer reduction objectives and other considerations. The data transfer reduction objectives can reduce the amount of data transfer that would otherwise be required from the transfer of array data as compared to, for example, distribution of arrays, array partitions or functions/ tasks that are randomly assigned to worker nodes 110, or based on alternative considerations such as load-balancing.

During run-time, the computing environment performs array computations, using one or more array data sources. In some examples, the program 102 is constructed to implement a set of data transfer reduction objectives that minimize data movement of the programs array data sources during the run-time. Among other benefits, the reduction in data movement can significantly enhance the performance of the distributed computing environment in running the program 102.

The construct of program 102 can enable specific directives 103 and arguments 105 (or other semantic combinations) which promote data transfer reduction objectives that control the manner in which arrays and array partitions are processed. In particular, the data transfer reduction objectives can co-locate array partitions that are processed together, such as subjected to the same functions (e.g., array multiplication). The program 102 can enable arguments that specify arrays, or portions thereof, on which operations such as linear algebra and array multiplication are performed. The directives 103 can include a partition directive that results in the creation of a distributed array, and partitioned by blocks for which dimensions can be specified or determined. The program 102 can be constructed to enable other directives that promote the data transfer reduction objectives for arrays.

The storage layer 130 can include one or more data stores, such as provided by HBase, Vetrica or MySQL Cluster. At run-time, each of the master node 100 or worker nodes 110 can access the storage layer 130 to construct arrays and array partitions. The storage driver 120 supports parallel loading of array partitions. In some implementations, the storage driver 120 also supports callbacks that are registered with arrays and array partitions. When a callback is registered, a call back notification 129 can be communicated, from an entity that processes the array, to the storage driver 120 (or storage layer 130) in response to, for example, designated change events. The callback notification 129 can identify a change in a particular array or array partition. In examples provided, the changes that trigger callbacks can be specified by the program 102. For example, the programmer can specify what changes register callbacks to the storage driver 120 during run-time.

During run-time, the master node 100 can access the storage resources 128 to receive array data 111 for arrays and array partitions that are to be utilized in the performance of program 102. Likewise, the worker nodes 110 can access the storage resources to receive array data 113 corresponding to array partitions that are to reside with the particular worker during run-time. The master node 100 can further include logic to implement one or more data transfer reduction objectives. The data transfer reduction objectives can be implemented in part by, for example, a partition co-location component 112 that operates to determine a same worker node 110 for residence of array partitions that are accessed and modified together in, for example, the same function or task.

In addition to the co-location component 112, the master node 100 can implement the objective by scheduling tasks 119 as part of the run-time execution of the program 102. In particular, a task scheduling component 114 can assign tasks 119 to worker nodes 110, based on, for example, the presence of a needed array partition for that task on one of the worker nodes 110. The scheduling of tasks can include (i) location determination, where one of the worker nodes 110 from the set are selected o implement the individual tasks 119, and/or (ii) sequencing or timing the performance of tasks (e.g., using considerations such as dependencies amongst tasks for completion of other tasks). Other considerations, such as described with examples of FIG. 2 can also be included in the logic of the task scheduling component 114.

As described by an example of FIG. 1, data transfer reduction objectives can be implemented to reduce or minimize transfer of array data amongst the worker nodes 110 of the distributed computing environment. For example, the partition co-location component 112 can operate to maintain array partitions together when functions such as multiplication of the array partitions is needed. Likewise, the task scheduling component 114 can schedule tasks 119 to reduce or otherwise minimize the data flow between nodes. In some examples, the worker nodes 110 can be linked across networks, and communicate with one another using remote direct access (RDA) operations 115. In some variations, the RDA operations 115 can be used to transfer array data 113, corresponding to array partitions. For example, a task executing on one worker node 110 can access an array partition from another worker node 110 via one or more RDA operations 115. As noted, reduction in the number of RDA operations 115 can increase efficiency and performance for when the program 102 is implemented in run-time. Additionally, the worker nodes 110 can access array data 113 from the storage resource 128, and the implementation of objectives such as described can reduce the amount of data that is transferred between remote data storage resources 128 to the individual worker nodes 110.

An example of FIG. 1 illustrates data transfer reduction objectives that consider partition co-location and/or tasks scheduling. Other implementations can promote data transfer reduction objectives. For example, as described with an example of FIG. 2, array partitions can be cached on each worker node 110, using respective worker memory 118, when certain conditions are present that permit use of cached array data. In particular, the caching of the array partitions and data can be implemented for instances when array partitions are unchanged. The use of caching can further limit, for example, the need for worker nodes 110 to access remote data sources for array data 113.

In some implementations, the system 10 can assign versions to array partition. When, for example, the worker node 110 changes the array partition, the master node 100 or worker node 110 can change the version of the array partition. When the array partition is unchanged, the version of the array partition is unchanged, and the cached version of the array partition can be used.

In some variations, the worker memory 118 can also be used to maintain task queues. Task queues can also be implemented in order to enable efficient implementation of tasks with dependence, with minimal transfer of array data. For example, task queues can store handles to functions that have embedded dependents, as a mechanism to enable those functions to be queued until their respective dependents are updated.

In one implementation, each worker 110 communicates a notification to the master node 100 when an array has been changed. For example, the arrays can register the callback notifications 129 which cause the workers 110 to communicate notifications of new array versions when changes occur. The master node 100 can respond to the changes and send notifications to other arrays when a new array version exists. As described with an example of FIG. 2, sending notifications of array versions to worker nodes 110 in connection with tasks can facilitate data transfer reduction objectives for arrays, such as caching.

The master node 100 can also utilize one or more programmatic mechanisms for detecting and handling arrays and array partitions that are dependent on other arrays at run-time. For example, the directives 105 of the program 102 can include commands that identify dependencies amongst arrays or array partitions. As additional examples, the directives 105 of the program 102 can also specify when arrays need to be updated, particularly in the context of incremental functions or functions which are dependent on other functions. In an implementation, when a first array is dependent on other arrays, those other arrays are updated before a particular operation is performed on the first array. Tasks can also be queued pending completion of other tasks that update required arrays or array partitions.

In some examples, task queues can be provided with storage resources 128. The task queues can include handles to functions that are dependents of individual task clauses. The program 102 can be implemented to register call backs for arrays that are specified in clauses with dependencies. When such an array is updated, the clause that specifies that array as a dependency receives a notification signaling the occurrence of the array update. The notification can signal a version of the array partition that is updated. The version can be used to retrieve array data 113 corresponding to the update from the particular worker where the change was made, or from storage resource 128.

In some variations, the master node 100 includes fault tolerance component 116. The fault tolerance component 116 can be used to perform operations for backing up the master node 100 and the worker nodes 110. The master node 100 can maintain metadata information in a metadata store 126, for use in performing some or all of the backup operations. For the master node 100, the metadata 123 that is stored identifies the execution state of program 102, as well as the worker information (e.g., state of tasks or workers) and the symbol table. The master node 100 can, for example, be backed after completion of each task. The metadata can also include the version 139 of each array partition handled on each worker node 110. For example, the worker node 110 can communicate a new version 139 for an array partition to the master node 100 when that array partition is changed, and the master node 100 can communicate the array version 139 to other workers that need the partition. In addition to sending notifications of new array versions 139 that the master node can restart (or re-assign) the worker node 110 to implement the task on correct version of the array partition if failure occurs.

Additionally, the master node 100 can send periodic heartbeat messages to determine the progress or state of the worker nodes 110. The a worker node 110 fails, the worker can be restarted. Metadata for the particular worker can be maintained with the metadata store 126 and used to return the worker to a most recent state (that was backed up). The metadata for the workers can reflect the particular task and/or function that was running on the worker node 110, the inputs used by the worker node 110, and the version of the arrays that were in use on the failed worker node 110.

As described, processes such as described with fault tolerance component 116 enable, for example, the long array processes to be implemented and efficiently restored, even in the face of failure by the master node.

Methodology

FIG. 2 illustrates an example method for managing array computations during programmatic run-time in a distributed computing environment, according to an embodiment. A method such as described by an example of FIG. 2 can be implemented using, for example, components described with an example of FIG. 1. Accordingly, reference is made to elements of FIG. 1 for purpose of illustrating a suitable component for performing a step or sub-step being described.

Arrays partitions are identified which are accessed and/or modified together (210). The directives 105 of the program 102 can include commands that enable the programmer to specify arrays and array partitions, with size parameters that are either manually (e.g., by programmer) or programmatically identified. In one example, the program construct can support array partitioning. More specifically, array partitioning can be specified by directives included in the program 102. A directive can, for example, specify an array in an argument, and specify whether the dimension of the array partition, including whether the array partition is a row, column or block. Additionally, array partitioning can be dynamically determined.

At run-time, a set of data transfer reduction objectives can be implemented to reduce or minimize the instances in which array data is transferred between nodes of the computing environment (220). In some implementations, the set of data transfer reduction objectives can seek to co-locate arrays and array partitions on worker nodes 110. For example, the master node 100 may seek to co-locate array partitions which are accessed and modified together in a same function, or as part of a same task (222). Embodiments recognize that linear algebra programs often rely on structured processing, and array partitions can often be co-located by placing the ith partition of the corresponding arrays on the same worker node 110. In some variations, the directives of the program 102 can enable the programmer to specify a command that identifies which arrays are related and suitable for co-location on the same worker node 110.

As an addition or alternative, the master node 100 can also schedule tasks to minimize array data movement amongst the worker nodes (224). The task scheduling can include determining the location (e.g., worker node 110) on which the task is to be performed (225). In one implementation, the master node 100 can calculate the amount of remote data copy required for when a task is assigned to one of the worker nodes 110. The tasks can then be scheduled to minimize data movement. For example, the task scheduling component 114 of the master node 100 can locate worker nodes 100 to perform tasks based on, for example, the calculated amount of remote data copy required for individual tasks, as well as directives that specify relations amongst arrays in the program 102.

The task scheduling can also determine and accommodate the sequence in which tasks, or functions of tasks are performed (227). For example, the task scheduling component 114 can include determining dependencies of tasks on one another, using, for example, the directives specified in the program 102. Task queues can also be implemented in order to enable efficient implementation of tasks with dependence, with minimal transfer of array data. In implementation, dependent functions can be identified, and a function requiring other updates can be queued pending updates to such arrays. For example, when all dependence of a particular task are implemented and updated, then the particular task is performed.

As a variations, the sequencing of tasks can also include implementing callbacks between nodes, so that when array transfers do occur, they are efficiently implemented (e.g., minimized in occurrences). As an example, if Task A performs array multiplication to yield Array A, and Task B utilizes Array A, then the task scheduling component 124 can sequence the Task A and B so that the tasks can be co-located on the same worker node. As a variation, callbacks can be utilized between different nodes that carry Task A and Task B so that Task B is triggered with updates to the Array A.

The task scheduling can also utilize array caching (229) to reduce array data transfer. For example, the task scheduling component 114 can automatically cache and reuse arrays and array partitions whose version have not changed. For example, at run-time, the worker node 110 can keep the reference to an array alive after it is cached, and await notification of the master node 100 when another worker node or task has a new version of that array available. The worker node 110 can then access and receive the new version of the array from the storage resources 128. The worker node 110 thus accesses the storage resources 128 when the new version is available, rather than at, for example, each calculation when, for example, the array version has not changed.

Hardware Diagram

Figure 3:
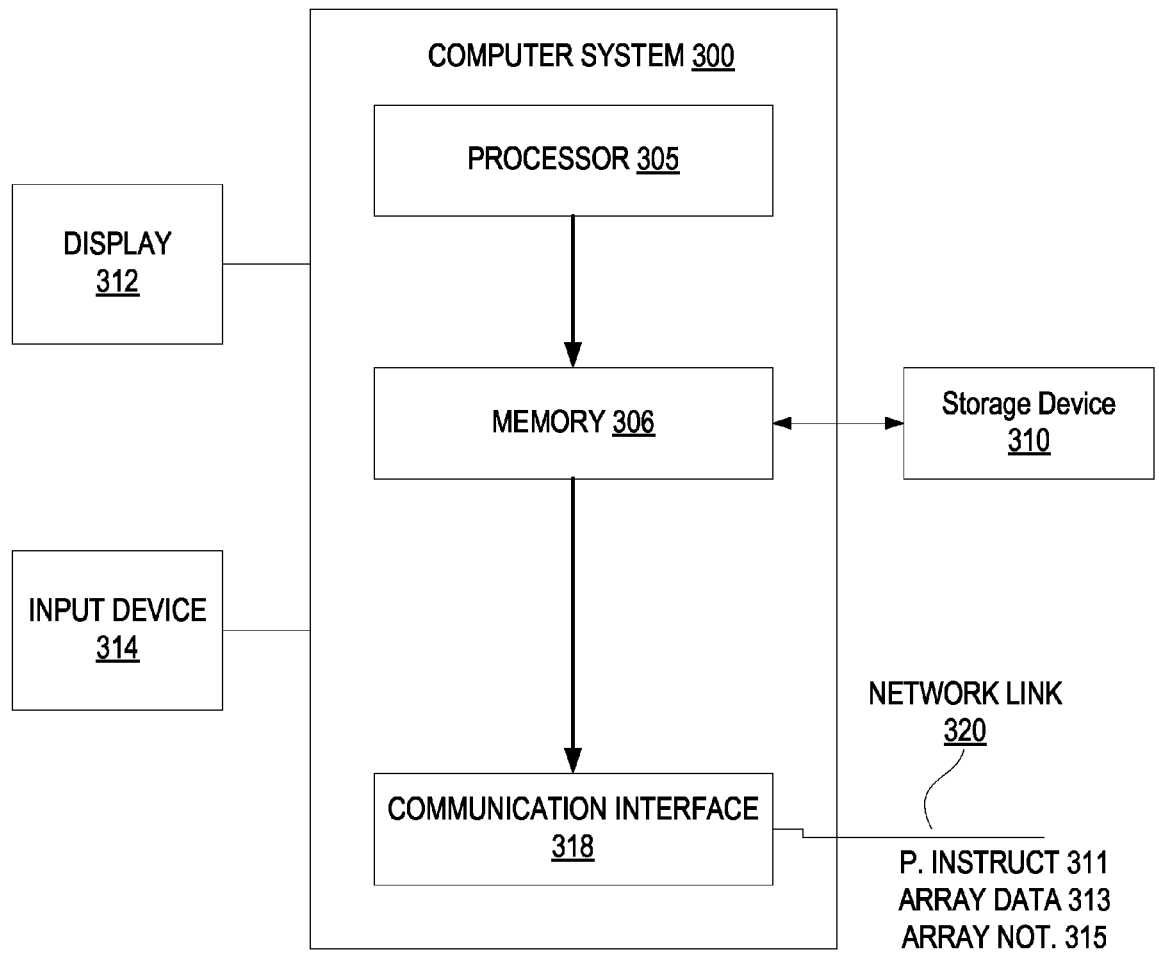
FIG. 3 illustrates an example computing system to implement functionality such as provided by an example system of FIG. 1 and/or an example method of FIG. 2.

FIG. 3 illustrates an example computing system to implement functionality such as provided by an example system of FIG. 1 and/or an example method of FIG. 2. For example, computing system 300 can be used to implement master node 100, or any one of the worker nodes 110. In one implementation, computer system 300 includes at least one processor 305 for processing instructions. Computer system 300 also includes a memory 306, such as a random access memory (RAM) or other dynamic storage device, for storing information and instructions to be executed by processor 305. The memory 306 can include a persistent storage device, such as a magnetic disk or optical disk. The memory 306 can also include read-only-memory (ROM). The communication interface 318 enables the computer system 300 to communicate with one or more networks through use of the network link 320.

Computer system 300 can include display 312, such as a cathode ray tube (CRT), a LCD monitor, or a television set, for displaying information to a user. An input device 314, including alphanumeric and other keys, is coupled to computer system 300 for communicating information and command selections to processor 305. The computer system 300 may be operable to implement functionality described with master node 100 or worker node 110 of system 10 (see FIG. 1). Accordingly, computer system 300 may be operated to implement a programmatic construct using a language such as, for example, R in order to implement functionality that provides for efficient management and use of arrays. The communication interface 318 can be used to, for example: (i) receive instructions 311 that are part of the program construct, (ii) exchange array data 313 with the storage resource 128 (see FIG. 1), and/or (iii) send or receive master-worker communications, such as array update notifications 315 that identify array versions and state information.

Embodiments described herein are related to the use of computer system 300 for implementing the techniques described herein. According to one embodiment, those techniques are performed by computer system 300 in response to processor 305 executing one or more sequences of one or more instructions contained in memory 306. Such instructions may be read into memory 306 from another machine-readable medium, such as a storage device. Execution of the sequences of instructions contained in main memory 306 causes processor 305 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for reducing data transfer amongst a plurality of computing devices in a distributed computing environment, the method implemented by one or more processors and comprising:
    defining, for multiple arrays utilized in a program at run-time, a plurality of array partitions used by a set of tasks of the program at run-time;
    assigning one or more tasks, in the set of tasks, to each of the plurality of computing devices of the distributed computing environment to perform the one or more tasks, the one or more tasks including implementing an objective to reduce data transfer amongst the plurality of computing devices;
    determining two or more array partitions accessed or modified by the one or more tasks during run-time of the program;
    locating the two or more array partitions on a first computing device of the plurality of computing devices during the run-time of the program;
    wherein implementing the objective includes:
    determining at least one of the set of tasks that require use of the one or more array partitions when the one or more array partitions are updated; and
    sending a notification to the plurality of computing devices indicating that the one or more array partitions have been updated to cause the plurality of computing devices to implement the updated one or more array partitions by performance of the at least one of the set of tasks, so that performance of the at least one of the set of tasks utilizes the one or more array partitions after being updated.

2. The method of claim 1, wherein defining the plurality of array partitions includes enabling one or more array partitions of the plurality of array partitions to be defined in a construct of the program.

3. The method of claim 1, further comprising:
    scheduling the one or more tasks that access or modify the two or more array partitions.

4. The method of claim 3, wherein scheduling the one or more tasks includes locating each of the two or more array partitions on the first computing device.

5. The method of claim 3, wherein scheduling the one or more tasks includes sequencing the one or more tasks in utilizing the two or more array partitions.

6. The method of claim 1, further comprising:
    determining a dependency of a first task in the set of tasks on a particular array partition updated by a second task in the set of tasks; and
    queuing the first task to initiate upon the particular array partition being updated by the second task.

7. The method of claim 1, further comprising:
    determining, on a particular computing device of the distributed computing environment, that a particular array partition is unchanged as a result of performing a task function on the particular computing device;
    caching the particular array partition on the particular computing device; and
    using the cached particular array partition during a next instance in which the particular array partition is needed by one of the tasks in the set of tasks.

8. The method of claim 7, further comprising:
associating a version with the particular array partition, and incrementing the version when the particular array partition is changed.

9. The method of claim 1, wherein assigning each of the plurality of computing devices is performed on a master node that communicates with a plurality of worker nodes corresponding to the plurality of computing devices, and wherein each of the plurality of computing devices communicates state information to the master node about one or more tasks in progress, and wherein the master node maintains the state information in order to restart any respective computing device of the plurality of computing devices if the respective computing device fails.

10. A computing system comprising:
one or more processors; and
one or more memory resources storing instructions for reducing data transfer amongst a plurality of computing devices in a distributed computing environment, wherein the instructions, when executed by the one or more processors, cause the computing system to:
define, for multiple arrays utilized in a program at run-time, a plurality of array partitions used by a set of tasks of the program at run-time;
assign one or more tasks, in the set of tasks, to each of the plurality of computing devices of the distributed computing environment to perform the one or more tasks, the one or more tasks including implementing an objective to reduce data transfer amongst the plurality of computing devices;
determine two or more array partitions accessed or modified by the one or more tasks during run-time of the program;
locate the two or more array partitions on a first computing device of the plurality of computing devices during the run-time of the program;
wherein implementing the objective includes:
determine at least one of the set of tasks that require use of the one or more array partitions when the one or more array partitions are updated;
and
send a notification to the plurality of computing devices indicating that the one or more array partitions have been updated to cause the plurality of computing device to implement the updated one or more array partitions by performance of the at least one of the set of tasks, so that performance of the at least one of the set of tasks utilizes the one or more array partitions after being updated.

11. The computing system of claim 10, wherein defining the plurality of array partitions includes enabling one or more array partitions of the plurality of array partitions to be defined in a construct of the program.

12. The computing system of claim 10, wherein the executed instructions further cause the computing system to:
schedule the one or more tasks that access or modify the two or more array partitions.

13. A non-transitory computer-readable medium storing instructions for reducing data transfer amongst a plurality of computing devices in a distributed computing environment, wherein the instructions, when executed by one or more processors of a computing system, cause the computing system to:
define, for multiple arrays utilized in a program at run-time, a plurality of array partitions used by a set of tasks of the program at run-time;
assign one or more tasks, in the set of tasks, to each of the plurality of computing devices of the distributed computing environment to perform the one or more tasks, the one or more tasks including implementing an objective to reduce data transfer amongst the plurality of computing devices;
determine two or more array partitions accessed or modified by the one or more tasks during run-time of the program;
locate the two or more array partitions on a first computing device of the plurality of computing devices during the run-time of the program;
wherein implementing the objective includes:
determine at least one of the set of tasks that require use of the one or more array partitions when the one or more array partitions are updated;
and
send a notification to the plurality of computing devices indicating that the one or more array partitions have been updated to cause the plurality of computing device to implement the updated one or more array partitions by performance of the at least one of the set of tasks, so that performance of the at least one of the set of tasks utilizes the one or more array partitions after being updated.

14. The non-transitory computer-readable medium of claim 13, wherein defining the plurality of array partitions includes enabling one or more array partitions of the plurality of array partitions to be defined in a construct of the program.

15. The non-transitory computer-readable medium of claim 13, wherein the executed instructions cause the computing system to:
schedule the one or more tasks that access or modify the two or more array partitions.

* * * * *